United States Patent
Kuromizu

(10) Patent No.: US 8,144,288 B2
(45) Date of Patent: Mar. 27, 2012

(54) DISPLAY UNIT AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 136 days.

(21) Appl. No.: 12/678,750

(22) PCT Filed: Apr. 21, 2008

(86) PCT No.: PCT/JP2008/057660
§ 371 (c)(1),
(2), (4) Date: Mar. 18, 2010

(87) PCT Pub. No.: WO2009/037885
PCT Pub. Date: Mar. 26, 2009

(65) Prior Publication Data
US 2010/0214492 A1    Aug. 26, 2010

(30) Foreign Application Priority Data
Sep. 20, 2007 (JP) ................................. 2007-243338

(51) Int. Cl.
*G02F 1/1335* (2006.01)
(52) U.S. Cl. .......................................... 349/70; 349/71
(58) Field of Classification Search ............... 349/70–71
See application file for complete search history.

(56) References Cited

U.S. PATENT DOCUMENTS
2006/0038934 A1* 2/2006 Morishita et al. ............... 349/58

FOREIGN PATENT DOCUMENTS

| JP | 2005-347005 A | 12/2005 |
|---|---|---|
| JP | 2006-351247 A | 12/2006 |
| JP | 2007-108346 A | 4/2007 |
| JP | 2008-065131 A | 3/2008 |

OTHER PUBLICATIONS

Official Communication issued in International Patent Application No. PCT/JP2008/057660, mailed on Jul. 15, 2008.

* cited by examiner

*Primary Examiner* — Phu Vu
(74) *Attorney, Agent, or Firm* — Keating & Bennett, LLP

(57) ABSTRACT

A display unit (1) includes a lighting apparatus (3) having a light source (5) consisting of a fluorescent tube extending in one direction and a back chassis (4) for covering a rear side of the light source (5) and for holding both ends of the light source (5), and a display panel (2) positioned in opposition to the lighting apparatus (3), which illuminates the display panel (2). On the lighting apparatus (3), provided is an isolation chamber (20) which is arranged at the rear side behind the back chassis (4) in opposition to the end of the light source (5) and has an opening (20b) at its rear side. As a benefit of attachment of the isolation chamber (20), when vibration of the back chassis (4) which is caused by on/off switching of the light source (5) is transmitted into the isolation chamber (20), vibration is partly reflected and vibration components with each phase inverted to each other are combined to be released from the opening. As a result, any abnormal noise caused by vibration of the back chassis (4) can be reduced. The display unit (1) is available for a television receiver with a built-in liquid crystal display panel.

12 Claims, 3 Drawing Sheets

DISPLAY UNIT AND TELEVISION RECEIVER

TECHNICAL FIELD

The present invention relates to a display unit, and a television receiver, having a display panel, such as a liquid crystal panel, illuminated by a lighting apparatus.

BACKGROUND ART

A conventional display unit is disclosed in Patent Document 1. This display unit has a lighting apparatus opposite a display panel. The lighting apparatus is provided with a metal back chassis covering the rear-face side away from the display panel side, and inside the back chassis, a light source is disposed.

FIG. 6 is a plan view showing how the light source is supported inside the back chassis. Inside the back chassis 4, a plurality of light sources 5 comprising elongate fluorescent lamps are disposed. In the back chassis 4, connecting portions 9 are provided which connect both ends of the light sources 5 to support the light sources 5. Via the connecting portions 9, electric power is supplied from an inverter (unillustrated) to the light sources 5. The light sources 5 are, between both end parts thereof, supported by supporting members 10.

Patent Document 1: JP-A-2005-347005 (pages 4-9, FIG. 2).

DISCLOSURE OF THE INVENTION

Problems to be Solved by the Invention

Inconveniently, in the conventional display unit described above, when a voltage is applied to the light sources 5 comprising fluorescent lamps, an electromagnetic force exerts upon the light sources 5 a force in the direction perpendicular to the plane of FIG. 6. Thus, via the connecting portions 9, the back chassis 4 is pressed and is deformed. Accordingly, as the supply of electric power to the light sources 5 is turned on and off, the back chassis 4 vibrates. The larger the display unit, the higher the voltage applied to the light sources 5, and thus the greater the electromagnetic force, leading to the problem of unusual noise resulting from the display unit vibrating.

In particular, in a case where the back chassis 4 is formed of metal, a capacitor is formed between the light sources 5 and the back chassis 4, and a current passes through the back chassis 4 as well. Thus, the back chassis 4 itself is acted upon by the electromagnetic force, and vibrates harder, producing louder unusual noise.

An object of the present invention is to provide a display unit and a television receiver that do not produce unusual noise.

Means for Solving the Problem

To achieve the above object, according to the invention, a display unit including (a) an illuminating apparatus having (a-1) a light source comprising a fluorescent lamp extending in one direction and (a-2) a back chassis covering the rear-face side of the light source and holding both end parts of the light source and (b) a display panel opposite the illuminating apparatus, the illuminating apparatus illuminating the display panel, is characterized by the provision of an isolated chamber which is disposed on the rear-face side of the back chassis, opposite an end part of the light source, and which has an opening in the back face thereof.

With this structure, the back chassis covers the rear-face side of the illuminating apparatus and holds the light source, which comprises a fluorescent lamp, at both end parts thereof. The light source has a voltage applied between both end parts thereof and emits illumination light, so that the display panel disposed on the front-face side is illuminated. On the rear-face side of the back chassis, the isolated chamber is provided opposite one end part or both end parts of the light source. Under application of the voltage, the light source is acted upon by an electromagnetic force, and the vibration of the light source resulting from the supply of electric power being turned on and off conducts to the back chassis. The vibration of the back chassis conducts, in the form of vibration of air, into the isolated chamber. Part of the vibration of air inside the isolated chamber is reflected on a circumferential wall or the like and comes to have the opposite phase so that vibrations of opposite phases are synthesized and then released from the opening.

According to the invention, the display unit structured as described above is characterized by the provision of a partition plate which is supported on a circumferential wall of the isolated chamber and which partitions the inside of the isolated chamber to form a plurality of passages communicating with the opening. With this structure, the vibration of air that has conducted to the isolated chamber branches into a plurality of passages partitioned by the partition plate to travel further to the opening.

According to the invention, the display unit structured as described above is characterized by the provision of a sound-absorbing member on the inner wall of the isolated chamber. With this structure, the vibration of air that has conducted to the isolated chamber is absorbed by the sound-absorbing member.

According to the invention, the display unit structured as described above is characterized in that the back chassis is formed of metal. With this structure, a capacitor is formed between the light source and the back chassis, and when a voltage is applied to the light source, a current passes through the back chassis and is acted upon by an electromagnetic force. As the supply of electric power to the light source is turned on and off, in addition to the vibration of the light source, the back chassis itself vibrates, and the vibration of air conducts to the isolated chamber.

According to the invention, the display unit structured as described above is characterized in that the back chassis is formed of resin.

According to the invention, the display unit structured as described above is characterized by the provision of an inverter cover which covers an inverter for driving the light source and which is provided on the rear-face side of the back chassis, with the isolated chamber provided adjacent to the rear face of the inverter cover. With this structure, as the light source is turned on and off by being driven by the inverter, the back chassis vibrates, and the vibration of air conducts through the inverter cover to the isolated chamber.

According to the invention, the display unit structured as described above is characterized in that the width of the isolated chamber in the length direction of the light source is smaller than the width of the inverter cover.

According to the invention, the display unit structured as described above is characterized by the provision of a cabinet which covers the illuminating apparatus to form an exterior, with the isolated chamber provided on the cabinet and open on the illuminating apparatus side. With this structure, as the light source is turned on and off, the back chassis vibrates, and the vibration of air conducts between the cabinet and the illuminating apparatus into the isolated chamber, which is open on the illuminating apparatus side.

According to the invention, the display unit structured as described above is characterized in that the display panel comprises a liquid crystal panel having liquid crystal sealed between a pair of substrates.

According to the invention, the display unit structured as described above is characterized in that the light source is a dimmable cold cathode tube.

According to the invention, the display unit structured as described above is characterized in that the light source is a dimmable hot cathode tube According to the invention, a television receiver is characterized by the provision of the display unit structured as described above.

ADVANTAGES OF THE INVENTION

According to the invention, thanks to the provision of the isolated chamber which is disposed on the rear-face side of the back chassis, opposite an end part of the light sources, and which has the opening in the back face, when the vibration of the back chassis resulting from the light sources being turned on and off conducts inside the isolated chamber, part of it is reflected so that vibrations of opposite phases are synthesized and then released from the opening. In this way, it is possible to reduce unusual noise resulting from vibration of the back chassis.

Moreover, according to the invention, thanks to the provision of the partition plate which partitions the inside of the isolated chamber to form the plurality of passages communicating with the opening, by making the vibration of air travel through the plurality of passages, it is possible to easily synthesize vibrations of opposite phases. Moreover, since the partition plate is supported on the circumferential wall of the isolated chamber, it is possible to reduce the vibration conducting from the back chassis to the partition plate and thereby reduce the vibration of air produced inside the isolated chamber.

Moreover, according to the invention, thanks to the provision of the sound-absorbing member on the interior wall of the isolated chamber, the vibration of air is further attenuated by the sound-absorbing member. This helps further reduce unusual noise.

Moreover, according to the invention, since the back chassis is formed of metal, even when the back chassis itself vibrates under an electromagnetic force as the light source is turned on and off, it is possible, with the isolated chamber, to reduce unusual noise.

Moreover, according to the invention, since the back chassis is formed of resin, it is possible to prevent vibration of the back chassis itself under an electromagnetic force and thereby reduce unusual noise. It is then also possible to form the isolated chamber integrally with the back chassis and thereby reduce the number of components.

Moreover, according to the invention, thanks to the provision of the inverter cover on the rear-face side of the back chassis, the vibration of an end part of the light source connected to the inverter easily conducts to the inverter cover. Since the isolated chamber is provided adjacent to the rear face of the inverter cover, the vibration of the inverter cover conducts to the isolated chamber and is reduced, and this helps further reduce unusual noise.

Moreover, according to the invention, since the width of the isolated chamber in the length direction of the light source is smaller than the width of the inverter cover, the vibration of air easily collides with the circumferential wall of the isolated chamber. This helps reduce the vibration of air, and permits easy reversal of the phase of the vibration of air.

Moreover, according to the invention, since the isolated chamber open on the illuminating apparatus side is provided in the cabinet covering the illuminating apparatus and forming the exterior, it is possible to easily form the isolated chamber integrally with the cabinet.

LIST OF REFERENCE SYMBOLS

Figure 1:
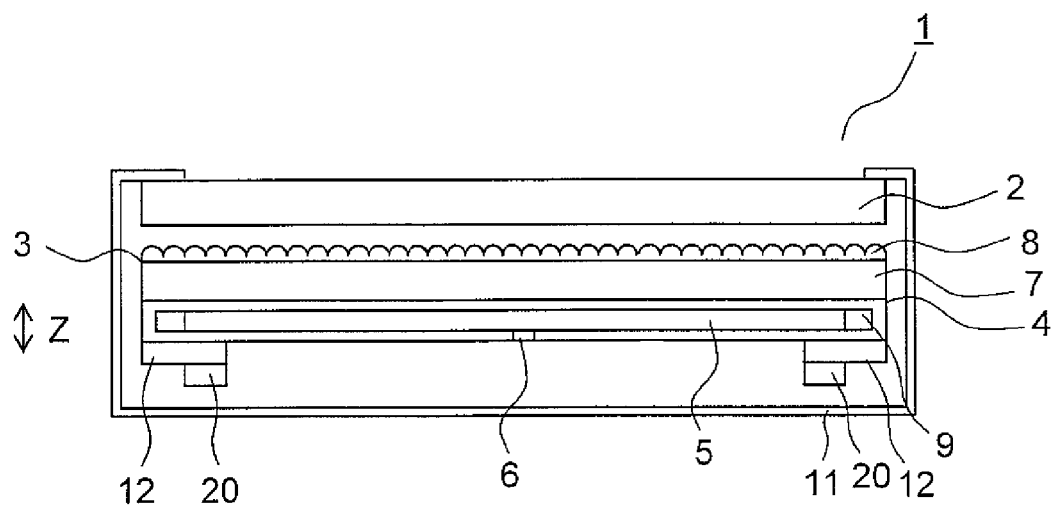
FIG. 1 A side sectional view of a display unit according to a first embodiment of the invention.

1 display unit
2 display panel
3 lighting apparatus
4 back chassis
5 light source
6, 10 supporting member
7 diffuser plate
8 optical sheet
9 connecting portion
11 cabinet
12 inverter cover
13 circuit board
14 inverter
20 isolated chamber
20*a*, 20*b* opening
21 partition plate
24, 25 sound-absorbing member

BEST MODE FOR CARRYING OUT THE INVENTION

Hereinafter, embodiments of the present invention will be described with reference to the accompanying drawings. FIG. 1 is a side sectional view of a display unit according to one embodiment of the invention. The display unit 1, which may be a television receiver or a display, has a lighting apparatus 3 disposed on the rear-face side of a display panel 2 such as a liquid crystal panel. The display panel 2 and the lighting apparatus 3 are supported by a cabinet 11, which is a resin molding and forms the exterior.

The display panel 2 comprises a liquid crystal panel or the like having liquid crystal sealed between a pair of substrates. The display panel 2 has pixels arrayed in a matrix, and the light emitted from the lighting apparatus 3 is transmitted through predetermined pixels of the display panel 2 to display an image.

The lighting apparatus 3 is provided with a metal back chassis 4 covering the rear-face side. Forming the back chassis 4 of metal helps obtain the desired strength while reducing thickness, contributing to miniaturization of the lighting apparatus 3. Inside the back chassis 4, light sources 5 are disposed. The light sources 5 comprise fluorescent lamps such as dimmable cold cathode tubes or hot cathode tubes ("dimmable" meaning that the amount of light emitted can be adjusted), and have a plurality of tubular fluorescent lamps disposed at a predetermined interval. The light sources 5 being dimmable permits easy control of the illuminance of the display unit 1. The light sources 5 may comprise a meandering fluorescent lamp.

The back chassis 4 is fitted with a diffuser plate 7 opposite the light sources 5. The diffuser plate 7 comprises a transparent or translucent plate-shaped member holding a diffusive material, and diffuses the light emitted from the light sources 5. On the diffuser plate 7, an optical sheet 8 such as a prism sheet or a lens sheet is disposed. The optical sheet 8 gathers the light emerging from the diffuser plate 7 into a predetermined viewing angle.

On the rear face of the back chassis 4, an inverter 14 (see FIG. 3) which drives the light sources 5 is placed, and an inverter cover 12 which covers the inverter 14 is provided. On the rear-face side of the inverter cover 12, an isolated chamber 20 is provided adjacently, which will be described in detail later.

Figure 2:
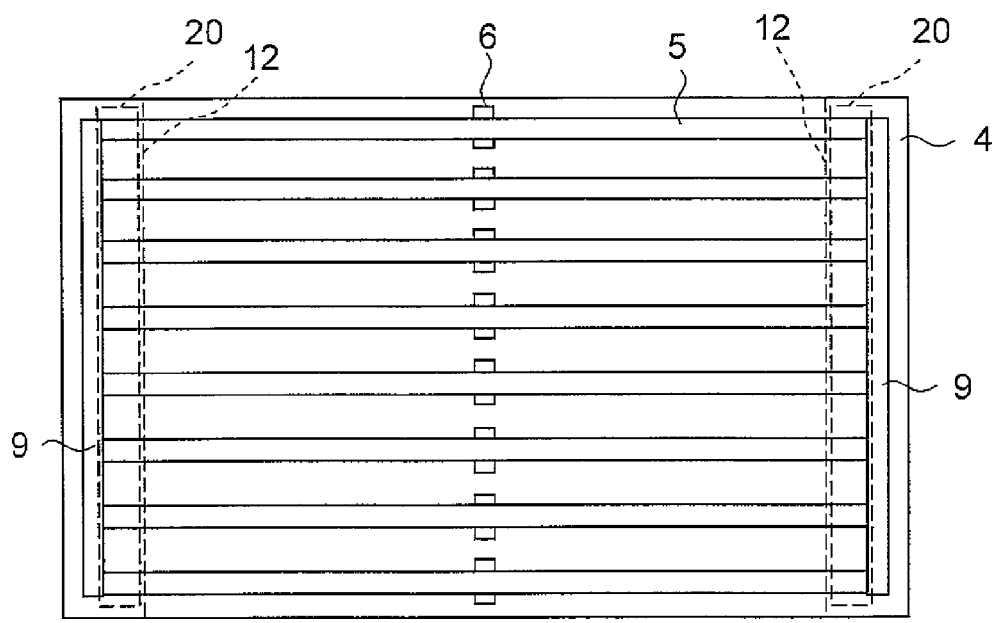
FIG. 2 A plan view showing how light sources are supported in the display unit according to the first embodiment of the invention.

FIG. 2 is a plan view showing how the light sources 5 are supported inside the back chassis 4. At both lateral parts of the back chassis 4, connecting portions 9 are disposed which hold both end parts of the light sources 5. The connecting portions 9 are connected to the inverter 14, and via the connecting portions 9, electric power is supplied from the inverter 14 to the light sources 5. The inverter cover 12 and the isolated chamber 20 are so formed as to be opposite both end parts of the light sources 5 and to extend in the direction in which the light sources 5 are arranged side by side.

On the back chassis 4, supporting members 6 are attached, and on the supporting members 6, the light sources 5 are mounted. The supporting members 6 comprise shock-absorbing members that absorb shocks by their elasticity, and resin or rubber having a sponge-like constitution or a cushioning property can be used. For example, usable for the supporting members 6 are polyethylene foam, rubber sponge, silicone gel, etc. Particularly preferable for the supporting members 6 is microcellular polymer (for example, PORON manufactured by ROGERS INOAC CORPORATION) for its shock-absorbing property.

The supporting members 6 are formed to have a transparent, white or whitish, or gray or grayish color. This helps prevent image quality degradation resulting from the supporting members 6 being reflected on the display panel 2. A white or whitish color includes not only a white or like color but also a faint yellow or other color. A gray or grayish color includes from a light to a dark gray color.

When connected to the connecting portions 9, the light sources 5 are pressed onto the supporting members 6 so that the supporting members 6 go into a contracted state. Thus, the circumferential faces of the light sources 5 are, over an area narrower than half their circumference, kept in contact with the supporting members 6, so that the light sources 5 are, between both end parts thereof, supported by the supporting members 6. That is, the light sources 5 are, at both end parts and a middle part thereof, supported by the back chassis 4 integral with the supporting members 6. As a result, the light sources 5 are prevented, by the elasticity of the supporting members 6, from moving toward the back chassis 4, and are prevented, by the friction force of the supporting members 6, from moving in the direction in which the light sources 5 are arranged side by side.

When a shock acts upon the display unit 1, the supporting members 6 absorbs it. This makes it possible to prevent damage to the light sources 5 that may result when a sagging under self-weight or shock during transport causes the light sources 5 to collide with the back chassis 4 or with the adjacent light sources 5. The light sources 5 may be supported at a plurality of places thereon, or at one place in a middle part thereof, by the supporting members 6.

Figure 3:
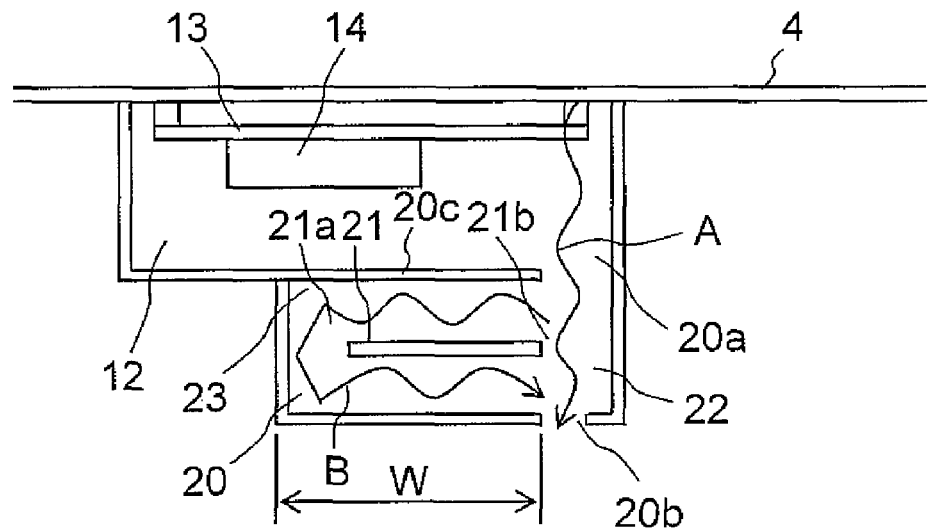
FIG. 3 A side sectional view of an isolated chamber in the display unit according to the first embodiment of the invention.

FIG. 3 is a side sectional view of the isolated chamber 20. The inverter cover 12 and the isolated chamber 20 are formed integrally as a resin molding, and are fitted to the back chassis 4. Inside the inverter cover 12, a circuit board 13 on which the inverter 14 is mounted is disposed. The circuit board 13 is fastened to the back chassis 4 with screws, and is covered by the inverter cover 12.

The isolated chamber 20 is adjacent to the rear-face side of the inverter cover 12, and is formed to have a smaller width W than the inverter cover 12 in the direction in which the light sources 5 extend. In an isolation wall 20c of the isolated chamber 20 formed by the inverter cover 12, an opening 20a is formed, and in the rear face of the isolated chamber 20, an opening 20b is formed.

Inside the isolated chamber 20, a partition plate 21 is provided which extends in the direction in which the light sources 5 is arranged side by side. The partition plate 21 is supported by a circumferential wall of the isolated chamber 20 perpendicular to the direction in which the light sources 5 is arranged side by side, and between each end of the partition plate 21 in the direction in which the light sources 5 extend and a circumferential wall of the isolated chamber 20, gaps 21a and 21b are formed. Thus, inside the isolated chamber 20, a plurality of passages 22 and 23 connecting between the openings 20a and 20b are formed. The passage 22 is formed to have a rectilinear shape, and the passage 23 is formed to have a cross-sectional shape like a square-cornered letter C.

In the display unit 1 structured as described above, the light emitted from the light sources 5 enters the diffuser plate 7. The light that has entered the diffuser plate 7 is diffused, and the diffused light enters the optical sheet 8. The light that has entered the optical sheet 8 has its direction aligned within the desired viewing angle, and then exits to illuminate the display panel 2. This permits the viewing of an image on the display panel 2.

Under application of a voltage, the light sources 5 are acted upon by an electromagnetic force in the direction (Z direction, see FIG. 1) perpendicular to the back chassis 4, and is deformed. Thus, via the connecting portions 9, the back chassis 4 is pressed and is deformed. Accordingly, as the supply of electric power to the light sources 5 is turned on and off, via the connecting portions 9, the back chassis 4 vibrates. Moreover, since the back chassis 4 is formed of metal, a capacitor is formed between the light sources 5 and the back chassis 4, and thus, when a voltage is applied to the light sources 5, a current passes through the back chassis 4 as well. Consequently, as the application of the voltage to the light sources 5 is turned on and off, the back chassis 4 itself vibrates under an electromagnetic force.

Since the supporting members 6 comprise shock-absorbing members, it can absorb the vibration of the back chassis 4. Also, the vibration of the back chassis 4 conducts, in the form of vibration of air, to the inverter cover 12. The vibration of air then conducts, via the isolation wall 20c and the opening 20a, to the isolated chamber 20.

The vibration of air that has conducted via the opening 20a to the isolated chamber 20 then, inside the isolated chamber 20, branches into the passages 22 and 23 and travels further as indicated by arrows A and B. Likewise, the vibration of air that has conducted via the isolation wall 20c to the isolated chamber 20 then branches into the passages 22 and 23 and travels further. Here, the vibration of air that has collided with the wall surface of the isolated chamber 20 and with the partition plate 21 comes to have the opposite phase. Thus, as a result of vibrations of opposite phases being synthesized, part of the vibration of air reaching the opening 20b is canceled. In this way, it is possible to reduce unusual noise in the display unit 1.

In this embodiment, thanks to the provision of the isolated chamber 20 which is disposed on the rear-face side of the back chassis 4, opposite the end parts of the light sources 5, and which has the opening 20b in the back face, when the vibration of the back chassis 4 resulting from the light sources 5 being turned on and off conducts inside the isolated chamber 20, part of it is reflected so that vibrations of opposite phases are synthesized and then released from the opening 20b. In this way, it is possible to reduce unusual noise resulting from vibration of the back chassis 4.

Providing the isolated chamber 20 adjacent to the back chassis 4 gives similar effects. For example, the isolated chamber 20 may be so formed as to extend in the direction perpendicular to, or parallel to, the light sources 5. Vibration of the light sources 5, however, easily conducts via the connecting portions 9, which support the light sources 5 at the end parts thereof, to the inverter cover 12. Accordingly, providing the isolated chamber 20 on the rear face of the inverter cover 12 helps reduce unusual noise more effectively.

Moreover, thanks to the provision of the partition plate 21 which partitions the inside of the isolated chamber 20 to form the plurality of passages 22 and 23 communicating with the opening 20b, by making the vibration of air travel through the passages 22 and 23, it is possible to easily synthesize vibrations of opposite phases. Moreover, the partition plate 21 is not fitted to the isolation wall 20c or to the back chassis 4, but is supported on the circumferential wall of the isolated chamber 20. This helps reduce the vibration conducting from the isolation wall 20c and the back chassis 4 directly to the partition plate 21, and thus helps reduce the vibration of air produced inside the isolated chamber 20.

Moreover, since the isolated chamber 20 has a width W smaller than the inverter cover 12 in the length direction of the light sources 5, the vibration of air easily collides with the circumferential wall of the isolated chamber 20. This helps attenuate the vibration of air, and permits easy reversal of the phase of the vibration of air.

Moreover, thanks to the provision of the opening 20a in the isolation wall 20c of the isolated chamber 20 formed by the inverter cover 12, it is possible to easily make the vibration of air travel via the opening 20a into the isolated chamber 20. Thus, it is possible to easily reduce, with the isolated chamber 20, the vibration of the back chassis 4.

Figure 4:
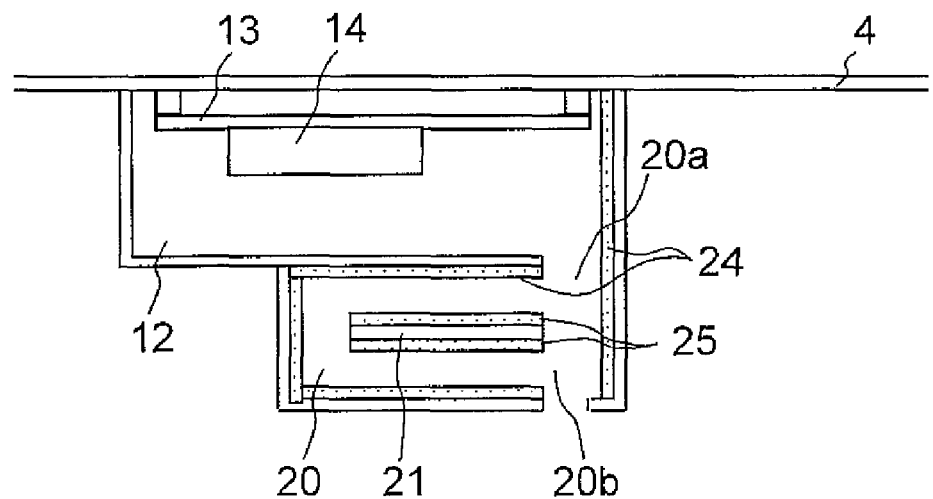
FIG. 4 A side sectional view of an isolated chamber in a display unit according to a second embodiment of the invention.

FIG. 4 is a side sectional view of an isolated chamber 20 in a display unit 1 according to a second embodiment of the invention. For convenience' sake, such parts as find their counterparts in the first embodiment shown in FIGS. 1 to 3 and described previously are identified by common reference signs. In this embodiment, on the interior wall of the isolated chamber 20 and on the surface of the partition plate 21, sound-absorbing members 24 and 25 are provided. In other respects, the structure here is similar to that in the first embodiment.

The sound-absorbing members 24 and 25 comprise glass wool or the like, and attenuates, when the vibration of air conducting through the isolated chamber 20 collides with the partition plate 21, the amplitude of the vibration of air. This helps further reduce unusual noise in the display unit 1. The isolated chamber 20 may be provided adjacent to the back chassis 4.

Figure 5:
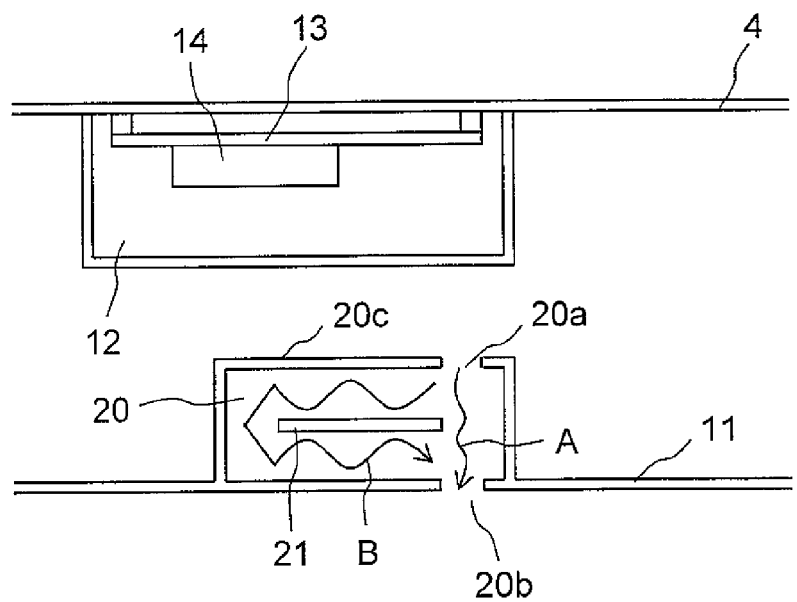
FIG. 5 A side sectional view of an isolated chamber in a display unit according to a third embodiment of the invention.
Figure 6:
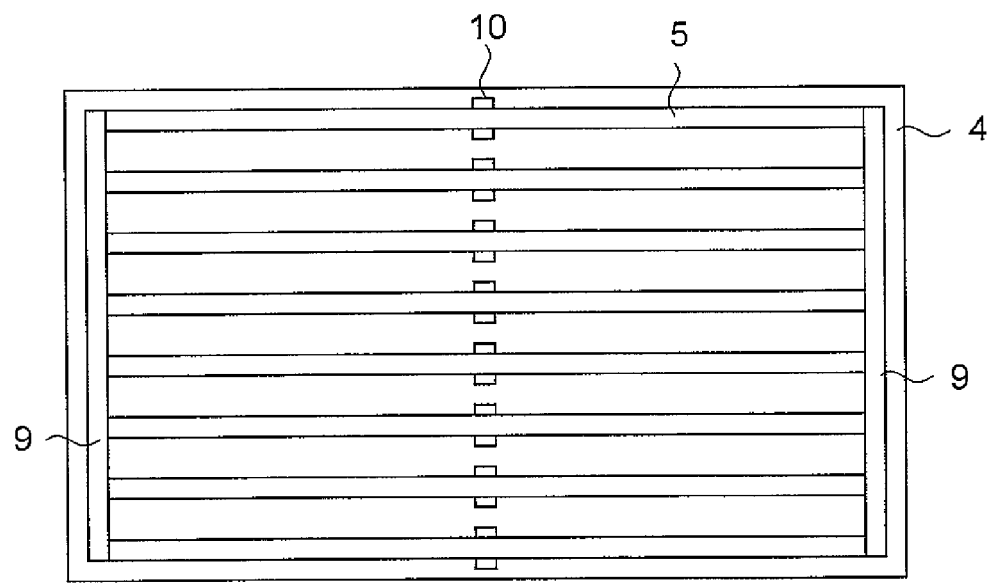
FIG. 6 A plan view showing how light sources are holed in a conventional display unit.

FIG. 5 is a side sectional view of an isolated chamber 20 in a display unit 1 according to a third embodiment of the invention. For convenience' sake, such parts as find their counterparts in the first embodiment shown in FIGS. 1 to 3 and described previously are identified by common reference signs. In this embodiment, the isolated chamber 20 is formed integrally with the cabinet 11, opposite both end parts of the light sources 5. In other respects, the structure here is similar to that in the first embodiment.

The isolated chamber 20 has an opening 20a formed on the lighting apparatus 3 side, and has an opening 20b formed on the rear-face side. The opening 20b forms an exhaust port for heat rejection from the lighting apparatus 3. Moreover, inside the isolated chamber 20, a partition plate 21 like that in the first embodiment is provided.

The vibration of the back chassis 4 conducts, in the form of vibration of air, to the inverter cover 12, and conducts through the space between the inverter cover 12 and the cabinet 11. The vibration of air that has conducted via the opening 20a to the isolated chamber 20 then, inside the isolated chamber 20, branches into passages 22 and 23 and travels further as indicated by arrows A and B. Likewise, the vibration of air that has conducted via a lighting apparatus 3 side isolation wall 20c to the isolated chamber 20 then branches into the passages 22 and 23 and travels further.

Here, the vibration of air that has collided with the wall surface of the isolated chamber 20 and with the partition plate 21 comes to have the opposite phase. Thus, as a result of vibrations of opposite phases being synthesized, part of the vibration of air reaching the opening 20b is canceled. In this way, it is possible to reduce unusual noise in the display unit 1.

Also in this embodiment, as in the first embodiment, thanks to the provision of the isolated chamber 20 which is disposed on the rear-face side of the back chassis 4, opposite the end parts of the light sources 5, and which has the opening 20b in the back face, when the vibration of the back chassis 4 resulting from the light sources 5 being turned on and off conducts inside the isolated chamber 20, part of it is reflected so that vibrations of opposite phases are synthesized and then released from the opening 20b. In this way, it is possible to reduce unusual noise resulting from vibration of the back chassis 4. Moreover, it is possible to easily form the isolated chamber integrally with the cabinet.

Moreover, thanks to the provision of the opening 20a on the lighting apparatus 3 side of the isolated chamber 20, it is possible to easily make the vibration of air travel via the opening 20a into the isolated chamber 20. Thus, it is possible to easily reduce, with the isolated chamber 20, the vibration of the back chassis 4.

Sound-absorbing members 24 and 25 like those in the second embodiment may be provided on the wall surface of the isolated chamber 20 and on the partition plate 21.

In the first to third embodiments, the isolated chamber 20 may be formed of aluminum, iron, stainless steel, zinc-plated steel sheet, or the like and fitted to the inverter cover 12 or the cabinet 11. Although, in the above description, the isolated chamber 20 is given a rectangular cross-sectional shape, it may instead be given a triangular, circular, regular hexagonal, or any other shape.

The back chassis 4 may be formed of resin. This helps prevent vibration of the back chassis 4 itself under an electromagnetic force and thereby reduce unusual noise. It is then also possible to form the isolated chamber 20 integrally with the back chassis 4 and thereby reduce the number of components.

Industrial Applicability

The present invention find applications in display units, such as television receivers and displays, having a display panel such as a liquid crystal panel.

The invention claimed is:

1. A display unit comprising:
   an illuminating apparatus including:
   a light source including a fluorescent lamp extending in one direction and a back chassis arranged to cover a rear-face side of the light source and to hold end portions of the light source; and
   a display panel opposite the illuminating apparatus, the illuminating apparatus illuminating the display panel; wherein
   an isolated chamber is disposed on a rear-face side of the back chassis, directly opposite to one of the end portions of the light source, the isolated chamber including an opening in a back face thereof.

2. The display unit according to claim 1, further comprising:
   a partition plate supported on a circumferential wall of the isolated chamber, the partition plate being arranged to partition an inside of the isolated chamber to thereby define a plurality of passages communicating with the opening.

3. The display unit according to claim 1, further comprising:
   a sound-absorbing member arranged on an inner wall of the isolated chamber.

4. The display unit according to claim 1, wherein the back chassis is made of metal.

5. The display unit according to claim 1, wherein the back chassis is made of resin.

6. The display unit according to claim 1, further comprising:
   an inverter cover arranged to cover an inverter driving the light source, the inverter cover being provided on the rear-face side of the back chassis; wherein
   the isolated chamber is provided adjacent to a rear face of the inverter cover.

7. The display unit according to claim 6, wherein a width of the isolated chamber in a length direction of the light source is smaller than a width of the inverter cover.

8. The display unit according to claim 1, further comprising:
   a cabinet arranged to cover the illuminating apparatus to define an exterior; wherein
   the isolated chamber is provided on the cabinet and is open on an illuminating apparatus side.

9. The display unit according to claim 1, wherein the display panel comprises a liquid crystal panel including liquid crystal sealed between a pair of substrates.

10. The display unit according to claim 1, wherein the light source is a dimmable cold cathode tube.

11. The display unit according to claim 1, wherein the light source is a dimmable hot cathode tube.

12. A television receiver comprising the display unit according to claim 1.

* * * * *